United States Patent Office 3,314,777
Patented Apr. 18, 1967

3,314,777
METHOD FOR REDUCING LODGING IN SMALL GRAINS
Robert H. Beatty, Philadelphia, Pa., assignor to Amchem Products, Inc., Ambler, Pa., a corporation of Delaware
No Drawing. Filed Apr. 30, 1964, Ser. No. 364,017
9 Claims. (Cl. 71—2.7)

The present invention relates to an agricultural process, and more particularly it relates to a process for preventing or minimizing lodging in small grains.

Lodging is the bending over or falling down of plants. It is particularly troublesome in plants growing in dense masses with a deficiency of light, as for example in fields of growing grains. It is caused by the formation of weak, etiolated stems, which in turn are caused by rank, dense, plant growth. It is also frequently caused by heavy fertilizer applications which are utilized for purposes of enhancing yields, but which lead to the production of thin cells and reduced culm strength as a result of rank growth attributed to the effects of the nitrogen content of the fertilizer.

Lodging is undesirable for reasons of the difficulties encountered in attempting to harvest grain which has lodged, and because of the attendant loss of yield due to the inability to recover properly the bent or fallen grain crop.

With the foregoing in mind the principal object of the present invention is the provision of an agricultural process which is capable of preventing or of substantially minimizing lodging in small grains.

Hereinafter, in this specification as well as in the claims appended hereto, reference to "small grains" will be understood as including barley, millet, oats, rice, rye and wheat.

The present invention is based upon the surprising discovery that application of the N-hydroxy-N-formyl glycinate anion, having the formula:

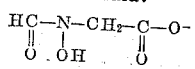

to growing grains, or to grain seeds prior to sowing, successfully prevents or substantially minimizes lodging of grains during subsequent growth thereof.

As noted, heretofore, two distinct methods of application have been found for achieving the desired plant response possible with this invention. One method comprises applying the active N-hydroxy-N-formyl glycinate anion directly to grain seeds prior to planting same, the other technique involves application of this agriculturally active anion to growing grains in accordance with the teachings presented below.

Where the application of the active N-hydroxy-N-formyl glycinate anion is to be made to grain seeds prior to planting, it has been found that the amount of chemical agent to be applied should be at least 5 parts per million parts by weight of the seeds being treated. Where less than the minimum 5 parts per million parts by weight is utilized, the surprising advantages derived from this invention may not be realized. In the alternative, it has been found that a practical upper limit of concentration of the active anion is about 500 parts per million parts of seed to be treated, since use of higher amounts sometimes adversely affects the germination rate of the treated seeds.

The active anion ingredient is simply contacted with the seeds to be planted, preferably by spraying a solution of the anion over the seeds prior to sowing. If desired, the seeds may be dried before planting, but this step is not essential for the successful operation of the process of this invention.

Where the active glycinate anion of this invention is to be applied to growing grains, the time of application is important and should be made during the early stages of plant growth commencing with the two-leaf stage when the grain measures from about two to about six inches in height and continuing until the grain reaches a height of about 18 inches. Maximum anti-lodging properties appear to be realized when the N-hydroxy-N-formyl glycinate anion is applied during the period of growth beginning with the two-leaf stage and continuing to the 5–6 leaf stage of plant development, so that this particular stage of development represents a preferred time of treatment.

Where the active glycinate anion of this invention is applied prior to the two-leaf stage of growth, injury to the grain may result and/or reduction in grain seed yield may occur. Conversely, if the chemical compound is applied after the grain has reached about 18 inches in height, the anti-lodging effects may be greatly minimized due to the advancing stage of maturity of the plants and reductions in grain seed yield may occur.

With respect to the amount of the N-hydroxy-N-formyl glycinate anion which must be applied to growing grains, from the class described, in order to realize the anti-lodging effects produced thereby, it has been found that if from as little as 50 to as much as 20,000 parts of this chemical compound, per million parts of carrier, is applied to an acre of growing grain, surprising improvements in anti-lodging properties will be realized.

Depending upon which particular growing grain is sought to be treated, and depending upon the stage of growth of the grain, more or less of the active chemical agent within the range noted above will be utilized. For example, it has been found that for grains at the same approximate stage of growth, oats are more tolerant toward this chemical compound than are barley plants, and that barley is more tolerant than wheat. However, the stage of grain development may reverse this trend so that wheat measuring about 18 inches in height may be found more resistant to injury than very young barley plants when treated with the same rate of chemical agent.

Application to the N-hydroxy-N-formyl glycinate anion to growing grains is readily accomplished using solutions, preferably aqueous solutions, of a water soluble salt of the active anion. However, solvents other than water for sparingly soluble derivatives or salts of this anion may be employed in accordance with well known economic practices and as described below.

So far as concerns utilization of the N-hydroxy-N-formyl glycinate anion which has been found to be suitable in accordance with the teachings of this invention, it is preferred to employ this anion in conjunction with a cation which forms a water soluble salt of the active ingredient. Cations which yield water soluble salts include the alkali metal and ammonium ions, such as sodium, potassium and lithium. Also included among the cations which yield water soluble salts are the lower molecular weight amines such as the mono, di, and tri-straight or branched chain alkyl amines having from 1 to 4 carbon atoms in each alkyl group, and alkanol amines having from 2 to 3 carbon atoms in each alkyl group. Derivatives and salts formed from all of the foregoing cations possess a sufficient degree of water solubility so as to be capable of utilization in aqueous solutions. If desired, it is possible to utilize derivatives or salts of this active anion which have little or substantially no water solubility and which must be formulated into agricultural solvents, wettable powder formulations, or otherwise compounded into suitable form or agricultural practices. Typical of these latter derivatives are the lower alkyl esters which contain from 1 to 9 carbon atoms in the alkyl group, such as the methyl, ethyl, propyl, butyl, hexyl, octyl and nonyl esters of N-hydroxy-N-formyl glycinate. Also included among the latter substantially water insoluble salts and/or derivatives are the higher molecular weight salts of the active glycinate anion of this invention, including for example, the mono, di, and tri-straight or branched chain amines having from 5 to 18 carbon atoms in each alkyl group. It is recognized that various other derivatives of the active anion of this invention may be prepared and utilized. However, by claiming the basic anion in the appended claims it is intended to cover derivatives thereof or its association with cations, which form salts bearing the active N-hydroxy-N-formyl glycinate anion, and which salts display the usual biological activity which would be expected, and found, in the employment of a like amount of the active anion component thereof when used alone.

It has surprisingly been found that the incorporation of from 0.05 to 0.2% by weight of a nonionic surface active agent into aqueous solutions of the compound of this invention results in marked improvement in the effectiveness of the chemical treatment. The types of nonionic surface active agents which are suitable for use in this respect are the ethoxylated alkylphenols wherein the alkyl substituents contain from 8 to 9 total carbon atoms and wherein there are from 5 to 20 ethoxy groups per mol of the phenol, and ethoxylated fatty acid esters such as sorbitan monolaurate and sorbitan monooleate wherein there are from 5 to 20 ethoxy groups per mol of fatty acid ester. The preferred agents are the products resulting from the reaction of 20 mols of ethylene oxide with 1 mol of sorbitan monolaurate or sorbitan monooleate. A typical product of this type is sold under the trade name Tween 20, and is reported to contain 20 mols of ethylene oxide per mol of sorbitan monolaurate.

In order to illustrate the surprising anti-lodging properties caused by the process of the present invention there are presented below a series of field results which are presented herewith solely for the purpose of illustration and are not intended to be construed as in any way limiting the scope of this invention.

*Example I*

Field barley plants (Erie variety), which has matured to the 3 to 4 leaf stage, were sprayed with an aqueous solution containing the N-hydroxy-N-formyl glycinate anion (introduced into the solution as the sodium salt) at such a rate so as to yield an application per acre of 1,000 parts of the active ingredient per one million parts of carrier. Prior to harvest, the sprayed barley plot was inspected in comparison with untreated plots and striking differences were noted in that essentially no lodging had occurred in the sprayed barley plot while severe lodging was evident in the check or untreated plots.

*Example II*

Plots of field oats, matured to the height of 6–8 inches were sprayed with aqueous solutions containing the N-hydroxy-N-formyl glycinate anion (introduced into the solution as the potassium salt) so as to apply, per acre of grain, 1,000 parts thereof per million parts of solution. One plot was sprayed with this aqueous solution which also dissolved therein 0.02% of the product derived from the reaction of one mol of sorbitan monolaurate with 20 mols of the ethylene oxide. Prior to harvest, the sprayed plots were inspected, and were found to be noticeably improved with respect to reduced lodging as compared to checks or untreated plots which were badly lodged. The plot which had been sprayed with the aqueous solution containing the surface active agent showed substantially no noticeable lodging of the oat plants.

*Example III*

Experimental field plots of oats (Garry variety) matured to at least 3-leaf stage, were treated with aqueous solutions containing varying amounts of the N-hydroxy-N-formyl glycinate anion (introduced into the solution as the free acid) to determine what effect, if any, large doses of the active ingredient might have upon young grains. The observations recorded below in Table 1 were made several weeks after spraying.

TABLE 1

| Rate, p.p.m./acre of glycinate anion: | Lodging observations |
|---|---|
| Check (none) | Moderate to severe lodging. |
| 100 | Slight lodging. |
| 1,000 | Slight lodging. |
| 1,000+0.05% surface active agent [1] | Not noticeable lodging. |
| 10,000 | Slight lodging. |
| 10,000+0.05% surface active agent [1] | Not noticeable lodging. |

[1] Product derived from the reaction of 20 mols of ethylene oxide with one mol of sorbitan monolaurate.

*Example IV*

Field plots of the Selkirk variety of wheat were treated at the 2-leaf stage with aqueous solutions containing the N-hydroxy-N-formyl glycinate anion (introduced into the solution as the dimethyl amine salt) at a rate of 1,000 parts of the active ingredient per million parts of carrier per acre. The aqueous solutions also contained 0.02% of surface active agent derived from the reaction of 20 mols of ethylene oxide with one mol of sorbitan monooleate. Prior to harvest the plots were inspected and essentially no lodging was observed.

*Example V*

Field plots of Chifen variety spring wheat were sprayed with aqueous solutions containing the N-hydroxy-N-formyl glycinate anion (introduced into the solution in the form of the ammonium salt) so as to apply, per acre, rates of 50, 100 and 200 parts of the active ingredient per million parts of carrier, the treatment being conducted during the tiller stage. Observations of the effects of these treatments on heading were made approximately 30 days after spray application, and are recorded below in Table 2 in comparison with untreated plots.

TABLE 2

| P.p.m/acre of N-hydroxy-N-formyl glycinate anion: | Condition of wheat at harvest |
|---|---|
| Check (none) | Severly lodged. |
| 50 | Slightly lodged. |
| 100 | Essentially no lodging. |
| 200 | Do. |

*Example VI*

Aqueous solutions containing 5, 20 and 50 parts of the N-hydroxy-N-formyl glycinate anion (introduced into the solution as the ethyl ester) per million parts of carrier were sprayed over wheat and oats seeds immediately prior to planting. Periodic observations were then recorded for the germinated plants and are listed below in Table 3.

TABLE 3

| Stage | Control | Wheat and Oats |
|---|---|---|
| 9 weeks following planting. | No lodging | Grain of shorter height than control plants, no lodging. |
| 11 weeks after planting | Slight lodging | Little difference in height compared to controls, no lodging. |
| 13 weeks after planting | Badly lodged | Plants same height as controls, no lodging. |

From the foregoing results it can be seen that application of the N-hydroxy-N-formyl glycinate anion to stands of growing grains or to grain seeds prior to sowing, in accordance with the teachings of this invention, measurably reduces or substantially eliminates the lodging tendencies inherent within vigorously growing grains.

I claim:
1. A process for reducing lodging in small grains which comprises applying the N-hydroxy-N-formyl glycinate anion to growing grains in an amount sufficient to reduce lodging of said grains.

2. The process of claim 1 wherein the N-hydroxy-N-formyl glycinate anion is applied in an amount per acre of from 50 to 20,000 parts per million parts of carrier.

3. The process of claim 1 wherein the N-hydroxy-N-formyl glycinate anion is applied to growing grains at the stage of growth between the 2-leaf stage and the stage when the grain reaches 18 inches in height.

4. The process of claim 1 wherein the N-hydroxy-N-formyl glycinate anion is applied in the form of a water soluble derivative thereof.

5. A process for reducing lodging in small grains which comprises applying the N-hydroxy-N-formyl glycinate anion to grain seeds in an amount sufficient to reduce lodging of the subsequently germinated grain plants.

6. The process of claim 5 wherein the N-hydroxy-N-formyl glycinate anion is applied in an amount of at least 5 parts per million parts by weight of the seeds being treated.

7. The process of claim 5 wherein the N-hydroxy-N-formyl glycinate anion is applied in the form of a water soluble derivative thereof.

8. The process of claim 1 which also includes the use of from 0.05 to 0.2%— by weight of a nonionic surface active agent.

9. The process of claim 5 which also includes the use of from 0.05 to 0.2% by weight of a nonionic surface active agent.

References Cited by the Examiner

UNITED STATES PATENTS 3,154,578   10/1964   Kinnel et al.

LEWIS GOTTS, *Primary Examiner.*

JAMES O. THOMAS, Jr., *Examiner.*